(12) United States Patent
Kadatch et al.

(10) Patent No.: US 8,078,648 B2
(45) Date of Patent: Dec. 13, 2011

(54) DATA STRUCTURE FOR SUPPORTING A SINGLE ACCESS OPERATION

(75) Inventors: Andrew V. Kadatch, Redmond, WA (US); Drew Shaffer Roselli, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 300 days.

(21) Appl. No.: 11/763,525

(22) Filed: Jun. 15, 2007

(65) Prior Publication Data

US 2008/0313197 A1 Dec. 18, 2008

(51) Int. Cl.
*G06F 17/30* (2006.01)

(52) U.S. Cl. ........ 707/803; 707/791; 707/792; 707/793; 707/794; 707/795; 707/796; 707/802; 707/804

(58) Field of Classification Search .......... 707/791–796, 707/802–804, 600
See application file for complete search history.

(56) References Cited

U.S. PATENT DOCUMENTS

| | | | | |
|---|---|---|---|---|
| 3,676,846 | A * | 7/1972 | Busch | 714/749 |
| 5,794,239 | A * | 8/1998 | Walster et al. | 707/6 |
| 5,819,289 | A * | 10/1998 | Sanford et al. | 707/104.1 |
| 6,016,492 | A * | 1/2000 | Saxton et al. | 707/100 |
| 6,016,497 | A * | 1/2000 | Suver | 1/1 |
| 6,052,387 | A * | 4/2000 | Chow et al. | 370/474 |
| 6,305,012 | B1 * | 10/2001 | Beadle et al. | 717/148 |
| 6,477,617 | B1 | 11/2002 | Golding | |
| 6,502,097 | B1 * | 12/2002 | Chan et al. | 707/100 |
| 6,662,357 | B1 * | 12/2003 | Bowman-Amuah | 717/120 |
| 6,931,487 | B2 | 8/2005 | Lubbers | |
| 7,036,043 | B2 | 4/2006 | Martin | |
| 7,103,794 | B2 | 9/2006 | Malcolm | |
| 7,107,396 | B2 | 9/2006 | Factor | |
| 7,177,872 | B2 * | 2/2007 | Schwesig et al. | 1/1 |
| 7,240,164 | B2 * | 7/2007 | Hooper et al. | 711/143 |
| 7,373,350 | B1 * | 5/2008 | Arone et al. | 1/1 |
| 2002/0184266 | A1 * | 12/2002 | Blessin | 707/513 |
| 2004/0122825 | A1 * | 6/2004 | Pulaski | 707/100 |
| 2005/0038964 | A1 * | 2/2005 | Hooper et al. | 711/143 |
| 2005/0060646 | A1 * | 3/2005 | Gauthier et al. | 715/513 |
| 2005/0144396 | A1 | 6/2005 | Eschmann | |
| 2005/0203927 | A1 * | 9/2005 | Sull et al. | 707/100 |
| 2005/0228811 | A1 * | 10/2005 | Perry | 707/101 |
| 2005/0246487 | A1 | 11/2005 | Ergan | |
| 2005/0256893 | A1 * | 11/2005 | Perry | 707/101 |
| 2005/0262049 | A1 * | 11/2005 | Somppi | 707/3 |
| 2005/0268341 | A1 * | 12/2005 | Ross | 726/26 |
| 2006/0013367 | A1 * | 1/2006 | Sawyer et al. | 379/88.01 |
| 2006/0026181 | A1 * | 2/2006 | Glickman | 707/100 |
| 2006/0149789 | A1 * | 7/2006 | Sorge et al. | 707/201 |

(Continued)

OTHER PUBLICATIONS

Holzner, Real World XML, Jan. 15, 2003, Peachpit Press, pp. 19-21, ISBN 978-0-7357-1286-7.*

(Continued)

*Primary Examiner* — Frantz Coby
(74) *Attorney, Agent, or Firm* — Shook, Hardy & Bacon L.L.P.

(57) ABSTRACT

A data structure is formatted that supports a single access operation while enabling data structure verification, data integrity verification, and data extensibility. The data format utilizes error identifier fields to enable the verification of data integrity and bracket pairs to verify data structure integrity and to support data structure extensibility. The data structure is utilized to perform a single access operation. In performing a single access operation, the data structure is read, the data format is verified, and the data integrity is verified. In addition, in instances where the data structure includes complex data, a new feature, or a prior program version, support for the complex data, new feature, or prior program version is provided.

19 Claims, 6 Drawing Sheets

U.S. PATENT DOCUMENTS

| | | | |
|---|---|---|---|
| 2006/0248290 | A1 | 11/2006 | Huras |
| 2006/0294300 | A1 | 12/2006 | Lubbers |
| 2007/0016547 | A1* | 1/2007 | Jump et al. .................. 707/1 |
| 2007/0067573 | A1 | 3/2007 | Bruening |
| 2008/0097744 | A1* | 4/2008 | Levy ............................ 704/4 |
| 2008/0263235 | A1* | 10/2008 | Hans et al. .................. 710/22 |
| 2010/0198868 | A1* | 8/2010 | Rys et al. .................... 707/769 |

OTHER PUBLICATIONS

Michael Okun et al., "Atomic Writes for Data Integrity and Consistency in Shared Storage Devices for Clusters," Computer Science Institute, The Hebrew University of Jerusalem, Italy, 2004, 18 pp.

Gary Valentin, et al., "Improving Database Functionality and Performance Using an Object Store Architecture," 2002 IBM Corporation, IBM Haifa Research Laboratory, IBM Systems and Storage Seminar, Nov. 24, 2003, 20 pp.

Craig A.N. Soules, et al., "Metadata Efficiency in Versioning File Systems," Carnegie Mellon University, 16 pp.

John MacCormick et al., "Boxwood: Abstractions as the Foundation for Storage Infrastructure," Microsoft Research Silicon Valley, USENIX Association, OSDI '04: 64th Symposium on Operating Systems Design and Implementation, pp. 105-120.

* cited by examiner

DATA STRUCTURE FOR SUPPORTING A SINGLE ACCESS OPERATION

CROSS-REFERENCE TO RELATED APPLICATIONS

Not applicable

STATEMENT REGARDING FEDERALLY SPONSORED RESEARCH OR DEVELOPMENT

Not applicable.

SUMMARY

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The disclosure describes, among other things, a media, system, and method for formatting a data set to correspond with a data structure that supports a single access operation while enabling data structure verification, data integrity verification, and data extensibility. The various solutions are summarized below. In one aspect, error identifiers are computed and utilized in formatting the data structure such that the data integrity of the data structure may be verified.

The disclosure also describes a media, system, method that utilizes a data structure to perform a single access operation while enabling data structure verification, data integrity verification, and data extensibility. In one aspect, a portion of the data structure is read, and the data format and data integrity are verified. Thereafter, the data structure is written to a memory location or an output device.

BRIEF DESCRIPTION OF THE SEVERAL VIEWS OF THE DRAWINGS

Embodiments are described in detail below with reference to the attached drawing figures, wherein.

DETAILED DESCRIPTION

The present invention will be better understood from the detailed description provided below and from the accompanying drawings of various embodiments of the invention, which describe, for example, a computer-readable media, system, and method for generating a data structure and performing a single memory location operation. The detailed description and drawings, however, should not be read to limit the invention to the specific embodiments. Rather, these specifics are provided for explanatory purposes that help the invention to be better understood.

Figure 1:
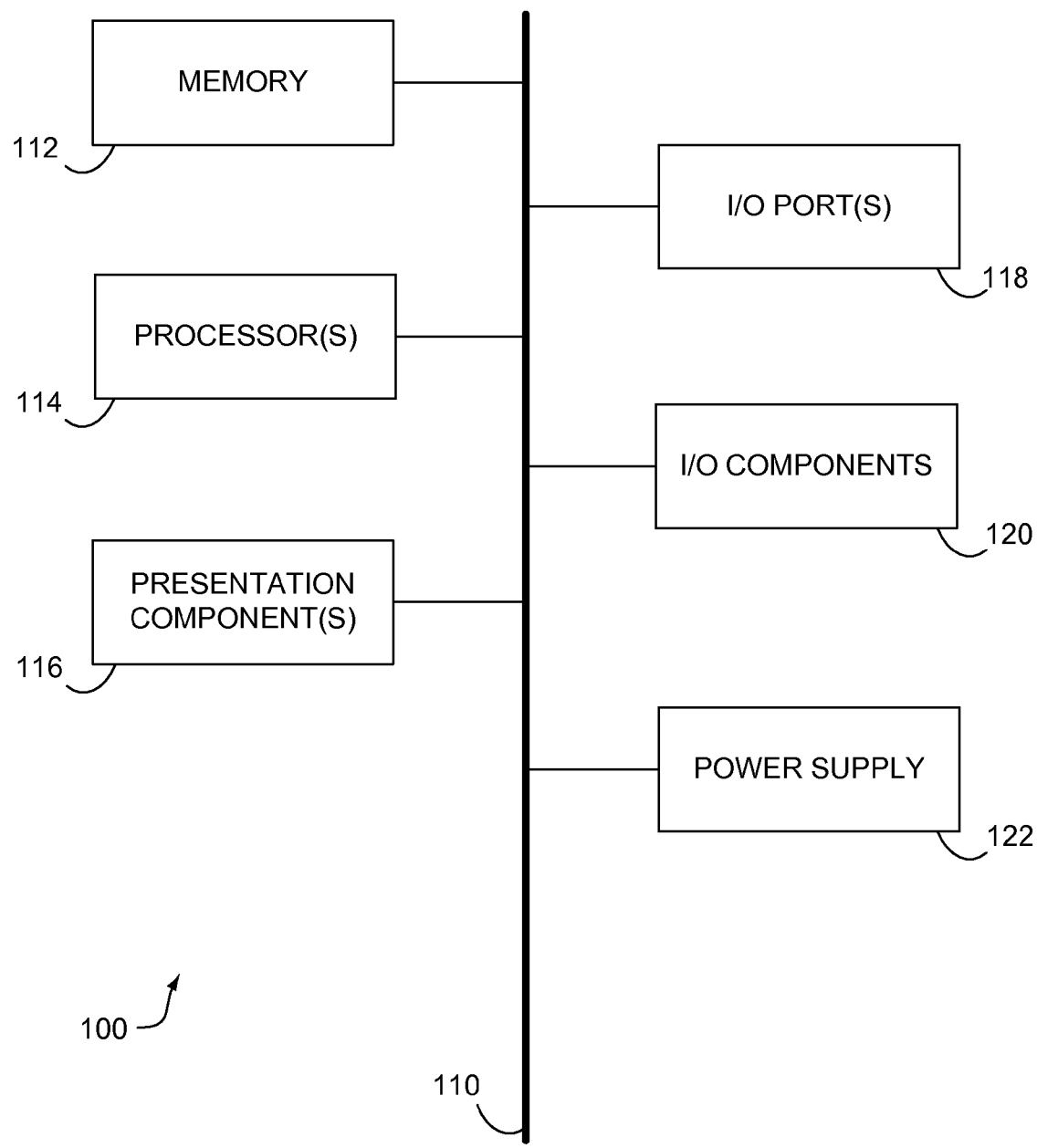
FIG. 1 is a block diagram of an exemplary operating environment suitable for use in implementing embodiments of the present invention.

Referring to FIG. 1 in particular, an exemplary operating environment for implementing the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that performs particular tasks or implements particular abstract data types. The invention may be practiced in a variety of system configurations, including hand-held devices, consumer electronics, general-purpose computers, more specialty computing devices, etc.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built in. Illustrative components include a microphone, joystick, game pad, satellite dish, scanner, printer, wireless device, etc.

Many different arrangements of the various components depicted, as well as components not shown, are possible without departing from the spirit and scope of the present invention. Embodiments of the present invention will be described with the intent to be illustrative rather than restrictive. Alternative embodiments will become apparent to those skilled in the art that do not depart from its scope. A skilled artisan may develop alternative means of implementing improvements without departing from the scope of the present invention.

Figure 2:
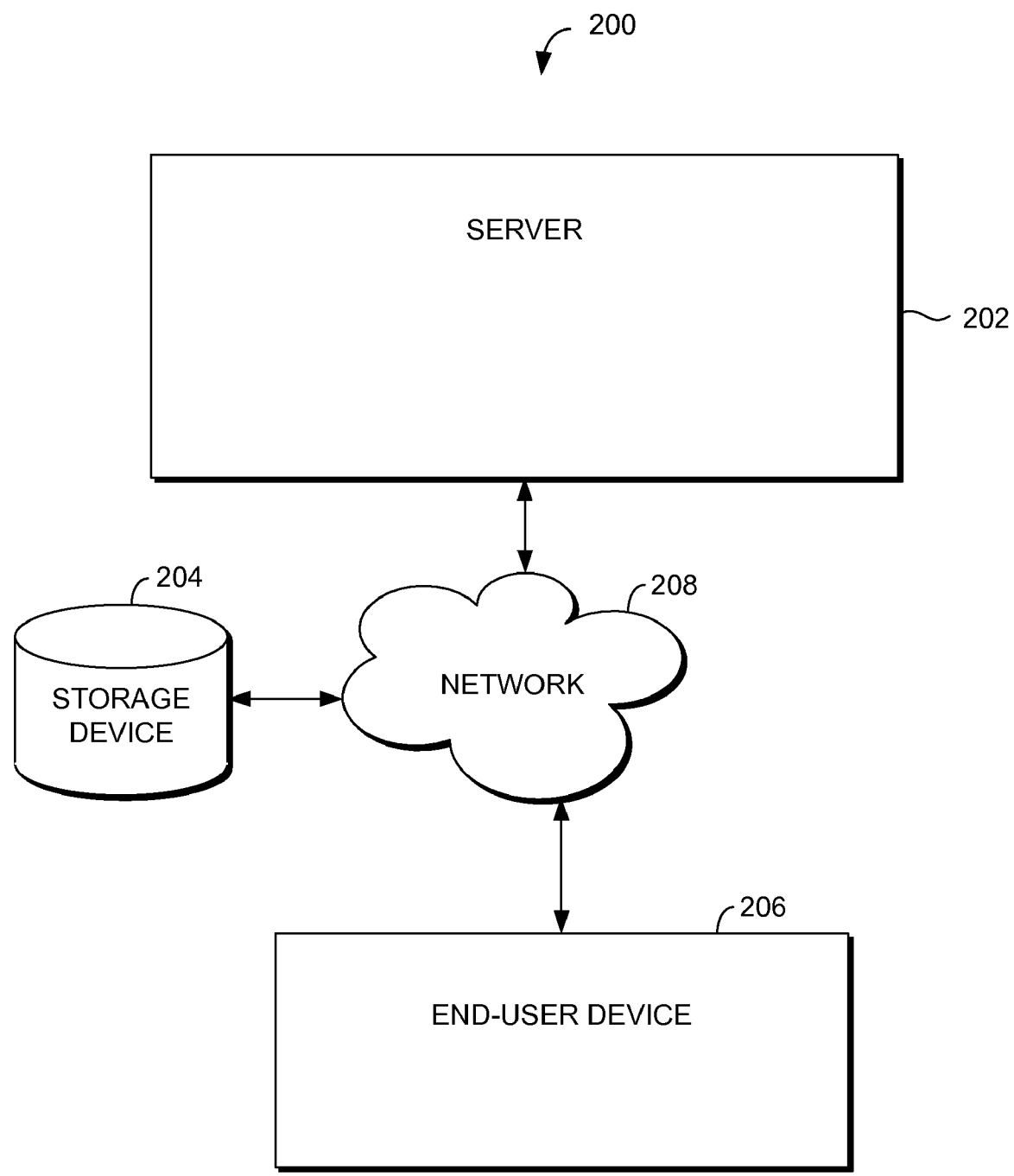
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with a data structure. In embodiments, the storage device 204 is configured to be searchable for one or more of the items stored in association therewith. It will be understood and appreciated by those of ordinary skill in the art that the information stored in association with the storage device 204 may be configurable and may include any information relevant to one or more data structures. The content and volume of such information are not intended to limit the scope of embodiments of the present invention in any way. Further, though illustrated as a single, independent component, the storage device 204 may, in fact, be a plurality of storage devices, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include a type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server™ 2005, which was developed by the Microsoft® Corporation headquartered in Redmond, Wash.

Components of server 202 (not shown for clarity) may include, without limitation, a processing unit, an internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

Figure 3:
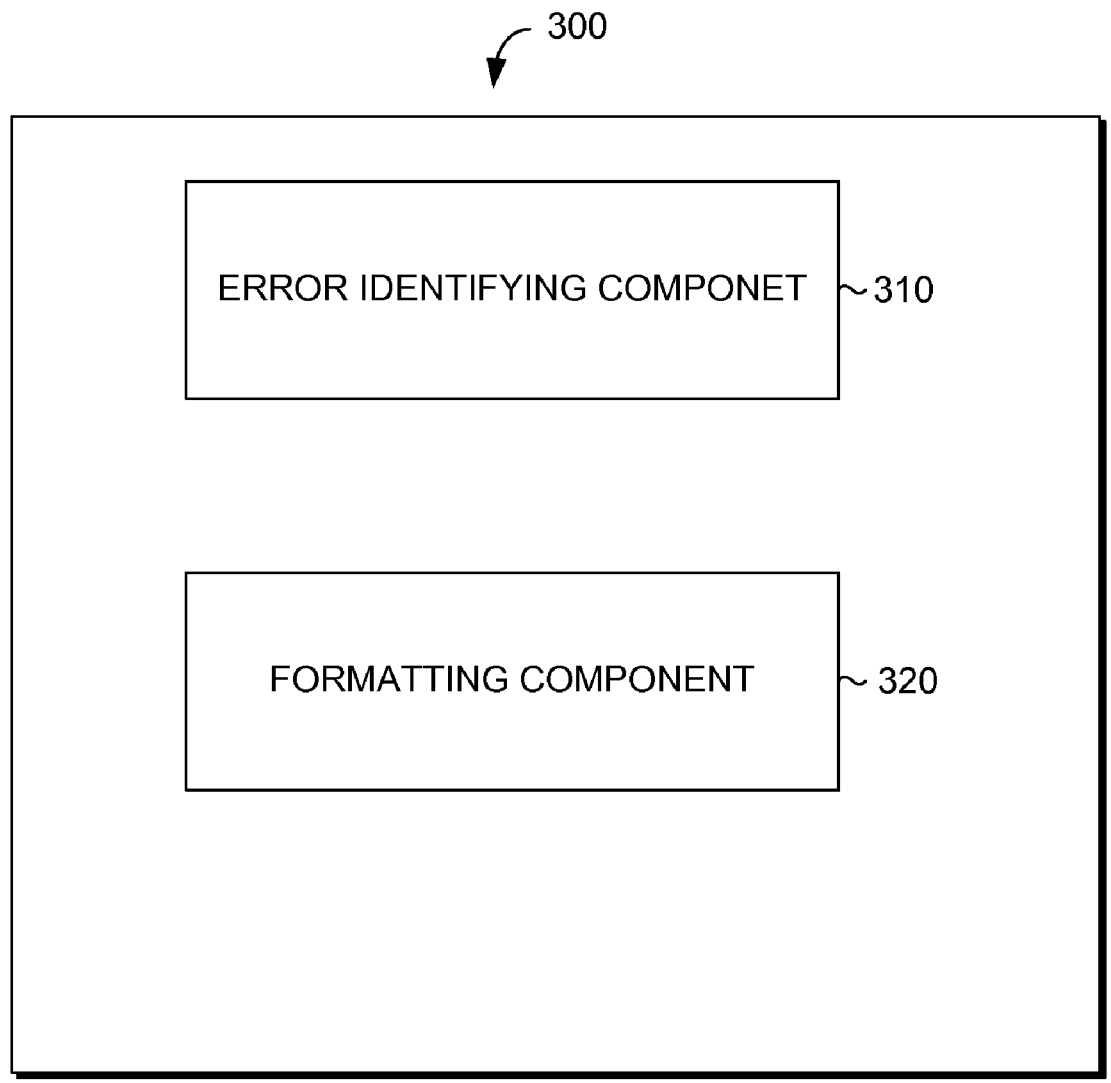
FIG. 3 is a block diagram of an exemplary computing system suitable for generating one or more data structures.

FIG. 3 illustrates an exemplary computing system 300 for formatting a data set to correspond with a data structure that supports a single access operation while enabling data structure verification, data integrity verification, and data extensibility. As shown in FIG. 3, an exemplary computing system 300 includes an error identifying component 310 and a data formatting component 320. In some embodiments, one or more of the illustrated components may be implemented as stand-alone applications. In other embodiments, one or more of the illustrated components may be integrated directly into the operating system or an application of the server 202 and/or an end-user device 206. It will be understood by those of ordinary skill in the art that the components illustrated in FIG. 3 are exemplary in nature and in number and should not be construed as limiting. Any number of components may be employed to achieve the desired functionality within the scope of embodiments hereof. Further, components may be located on any number of servers or computing devices.

The error identifying component 310 is configured for obtaining one or more error identifiers. In one embodiment, an error identifier may be obtained by error identifying component 310 performing a computation to determine the error identifier. In another embodiment, an error identifier may be obtained by error identifying component 310 receiving or retrieving the error identifier from another component or computing device, such as computing device 100. An error identifier may be a value, text, signature, or other type of identifier that may be used to verify data integrity of a data structure, i.e., determine whether data corruption exists within a data structure. An error identifier may comprise, for example, a checksum, a cyclic redundancy check, a secured signature, a Message-Digest algorithm 5 (MD5) signature, a secure hash algorithm signature, (e.g., SHA-256), or the like. In embodiments where preventing malicious data corruption is desired, a cryptographic hash function, such as an SHA-256 or MD5 signature should be utilized.

In some embodiments, the error identifier component 310 may obtain one or more error identifiers for a data structure upon receiving an indication, for example, from a user or the formatting component 320 to obtain error identifiers. In other embodiments, the error identifier component 310 may automatically obtain one or more error identifiers for a data structure. In either embodiment, the error identifiers may be obtained as the data set is obtained, as the data structure is formatted, at the completion of formatting (other than the inclusion of the error identifiers), at predefined events, or the like.

The formatting component 320 is configured for formatting a data set to correspond with a data structure that supports a single access operation while enabling data structure verification, data integrity verification, and data extensibility. A data set, as used herein, refers to one or more associated datum, e.g., values, text, symbols, or the like, that may be stored, transferred, transmitted, or output. In one embodiment, the data set may include data associated with file formats that may be used in network protocol, such as ASCII text, Rich Text Format (RTF), Document Content Architecture (DCA), Data Interchange Format (DIF), Data Exchange File (DXF), Tagged Image File Format (TIFF), Encapsulated PostScript Format (EPSF), and the like. In one embodiment, the data may be information associated with a search engine.

The data structure utilized by formatting component 320 includes a header section and a body section like a data packet. The header section includes one or more data fields, such as a data type field, a size field, and the like. A data type field may be used to communicate the type of data within the data set. A size field may be used to communicate the size of the header, e.g., the number of bytes of the header. In one embodiment, the header section and the body section may include self-describing data. Self-describing data is data that may be understood without requiring other information to define or identify the data. Such self-describing data may be utilized within the data structure to assist in providing various benefits, such as the postponement of recompression, prevention of the need for re-computing error identifiers or updating data, the broadcasting of information to applications, and the like.

In some embodiments, because it may be necessary to provide auxiliary information for a data structure, the header section of the data structure may be accessible. In such an embodiment, the header section may include a standard portion for predefined data and an auxiliary portion for user-defined data. The standard portion of the header may have one or more data fields, such as a data type field that communicates the type of data within the data set and a size field that indicates the size of the standard portion of the header, e.g., the number of bytes of the standard portion of the header. The auxiliary portion of the header may also include one or more data fields, such as a size field that indicates the size of the auxiliary portion of the header, e.g., the number of bytes of the auxiliary portion of the header, and other fields for user-defined data. In some embodiments, in instances where it is unnecessary to provide auxiliary information for a data structure, data fields within the auxiliary portion of the header may default to a value of zero.

The header section of the data structure is configured to provide a combination of desired data structure benefits. One such desired data structure benefit may include data extensibility. As such, the header section may be structured to enable data extensibility. Data extensibility may refer to the capability to represent complex data, structures, and objects.

To support complex data, structures, and objects, brackets may be utilized. In one embodiment, open- and close-end brackets provide a method for simplifying complex data. Because many complex objects include a plurality of simple objects, the data format may reflect such a relationship and mechanisms may be utilized to handle embedded objects within a complex object. For example, a line may be a complex object that includes a set of points, i.e., set of individual coordinates positioned within a coordinate axis. Brackets may be used to provide an expression of the relationship among complex objects and simple objects. For example, a point may be described as {dataBlock:"point", 3.0 5.0 7.0}, and a line may be described as {openBracket:"line"} {dataBlock:"point", 1.0 2.0 3.0} {dataBlock:"point" 4.0 5.0 6.0} {closeBracket:"line"}. In such an instance, the complex object "line" is comprised of two primitive objects "point." Accordingly, the data structure, with use of brackets, may describe arbitrarily complex objects as well as maintain and verify integrity of such objects at any instance throughout data processing. In some embodiments, such a result may occur without understanding semantics of the object.

In addition to representing complex data, structures, and objects, data extensibility may also refer to the capability to extend the use of preexisting code, to provide support for new features, or a combination thereof. To extend the use of preexisting code, i.e., backward compatibility, and/or provide support for new features, i.e., forward compatibility, the header section may utilize a minimal version data field. The minimal version field communicates the minimal version of a program that is necessary to support a specific data structure.

By way of example only, to illustrate extending the use of preexisting code, assume that version three (3) of a particular drawing program allows colored drawings and that version 3 is set forth as the minimal version in the header section of a data structure. Further assume that, at a later instance, the data structure is retrieved with a computing device having version two (2) of the drawing program, which does not provide for colored drawings. In such a case, the computing device having version 2 may be unable to support color information included in the data structure. However, because the version 2 drawing program may determine that version 2 is less than the minimal version required, i.e., version 3, the version 2 drawing program may ignore the color information. As such, although the version 2 drawing program may be unable to incorporate color into the drawing, the data set drawing may be opened and presented as a black and white drawing by version 2.

The minimal version field may also be utilized to provide support for new features. By way of example only, assume version A of a particular drawing program does not allow a specific data type, such as a polygon. Assume further that a data structure communicates that the minimal version is version B, wherein version B of the drawing program supports a new feature, such as a polygon data type, which is not supported by prior versions. As such, any version following requisite minimal version B, such as version C, may be able to support the new polygon data type.

Another desired data structure benefit may include data structure verification. Accordingly, the header section may be structured to enable data structure verification. Data structure verification refers to the capability to verify the integrity of the data structure syntax. In one embodiment, brackets, e.g., open-end and close-end brackets, are utilized as a syntax form to enable data structure verification. A single piece of data or a sequence of data may be positioned between an open-end bracket and a close-end bracket. The data structure may be verified, in part, by verifying that each open-end bracket is associated with a close-end bracket. In some embodiments, one or both brackets of a bracket pair, i.e., an open-end bracket and an associated close-end bracket, may reference each other. For example, the reference of the open-end bracket may be the length of data that is enclosed between the bracket pair to provide an indication of when to expect the close-end bracket.

In some embodiments, brackets pairs may be nested such that one pair of brackets may reside within another pair of brackets. In such an embodiment, the data structure may be further verified by verifying that one bracket pair does not overlap another bracket pair. By way of example only, assume two bracket pairs are included in a header. The first pair of brackets includes an open-end bracket A and a close-end bracket B. The second pair of brackets includes an open-end bracket 1 and a close-end bracket 2. In such a case, if the second pair of brackets is nested within the first pair of brackets, the data structure may be verified if the brackets are presented in the order of first pair open-end bracket A, second pair open-end bracket 1, second pair close-end bracket 2, and first pair close-end bracket B.

Further, another desired data structure benefit may include data integrity verification. As such, the header section may be structured to enable data integrity verification. Data integrity verification refers to the capability to verify the integrity of the data and, accordingly, ensure that no data corruption has occurred. One or more error identifiers obtained by error identifying component 310 may be utilized to verify the integrity of the data. As previously mentioned, an error identifier may comprise a checksum, a cyclic redundancy check, a secured signature, a SHA-256 signature, a MD5 signature, or the like. Accordingly, the header of a data structure may include one or more error identifier fields.

In some embodiments, error identifying component 310 may automatically communicate error identifiers to the formatting component 320. In such an embodiment, error identifiers may be automatically communicated, for example, based upon the error identifying component 310 receiving an indication from formatting component 320, a user, or the like, that it is desired to send a data set across the network or save the data set to storage. Alternatively, error identifiers may be automatically communicated based upon a predefined event, e.g., time or computer function.

In other embodiments, formatting component 320 may obtain the error identifiers by retrieving the error identifiers from the error identifying component 310. For example, upon the occurrence of a predetermined event or upon the formatting component 320 receiving an indication to send a data set across the network or save the data set to storage, formatting component 320 may retrieve one or more error identifiers from error identifying component 310.

The header section may include one or more error identifiers. In embodiments where the header section includes a standard portion and an auxiliary portion, each of the standard portion and the auxiliary portion may include one or more error identifiers. In one embodiment, the error identifier may be enclosed in brackets.

In one embodiment, an error identifier may exist for one or more bracket pairs that enclose data or data sequences. Because it is not always necessary to verify all of the data within a data structure, bracket pairs assist in efficiently performing data integrity verifications. For example, in an instance where two or more pairs of brackets are nested, performance efficiency is increased if data integrity is determined for only the outer bracket pair. In addition, data integrity may be verified for a portion of the data structure, an entire data structure, or a combination thereof. For example, because only a portion of a data structure may be desired or utilized in a particular instance, it may only be necessary to verify the desired or utilized portion of the data structure. As such, although there is not a guarantee that all of the data is uncorrupted, verifying only the desired or utilized portion allows efficient access to the desired or utilized portion without the need to load and verify the entire data structure. The remaining portion may be verified at a later instance.

Data may become corrupted on a disk, over the network, or during the transference or transmittance to or from a disk, network, memory, and the like. Because data may be corrupted at any instance and it is critical to detect data corruptions as early and as often as possible, in one embodiment, the data structure may be preserved such that it is constantly in verifiable form. To preserve the data structure, the entire data structure including the data, headers, and associated error identifiers, is maintained in its entirety. Accordingly, regardless of whether a data structure is stored, transferred, transmitted, or written, the data structure remains in the same form. As such, the integrity of the data may be maintained and the integrity of the data may be verified at any instance. For example, upon sending a data structure across the network or upon writing the data structure to a disk, the integrity of the data structure may be verified. In such an embodiment, the data structure is transmitted in the original form including the original error identifiers. Because re-computing error identifiers introduces an opportunity for data corruption, transmitting the data structure in the original form reduces the opportunity for data corruption. Accordingly, the data structure may be transferred over a network or other channel for use by another device without the need to recalculate any error identifier or update any data.

In some instances, a data structure may be in an incorrect location even though no errors are detected by the error identifiers. Accordingly, in some embodiments, in addition to an error identification field, the header of a data structure may also include a location origin signature field to further detect errors. The location origin signature field may communicate location information, location origin, or the like. The location origin signature field enables the identification of data structures or portions of data structures positioned in an incorrect location.

Another desired data structure benefit may include the capability to transfer data in a compressed form and/or an encrypted form. In a case where transferring data in a compressed form is desired, the header section may also include a compression field and a compression type field. The compression field may communicate whether data is compressed. The compression type field may communicate the type of compression used. In a case where transferring data in an encrypted form is desired, the header section may also include an encryption field and an encryption type field. The encryption field may communicate whether data is encrypted, and the encryption type field may communicate the type of encryption algorithm utilized. In an instance where data is to be transferred or transmitted in either a compressed form or an encrypted form, at least two error identifiers may be obtained. In such an instance, one error identifier may be obtained for the original data and another error identifier may be obtained for the compressed form or encrypted form. As such, where the data is compressed, the integrity of the data may be verified for the original data, the compressed data, or a combination thereof. Where the data is encrypted, and a key is provided to decrypt the data, the integrity of the data may also be verified for the original data, the encrypted data, or a combination thereof.

Another desired data structure benefit may include the ability to utilize a system having C1/C2 compliance. When writing to a sparse file, e.g., a number of entries are identical, by utilizing C1/C2 compliant underlying store, only the non-sparse data need to be written yet the data is robustly stored without an additional disk transaction required. In instances where the C1/C2 compliant underlying store is utilized, the data structure exploits its guarantee that portions of the data that have not been written yet are blank. In such a case, a sequence of blanks are used as transaction completion flags, thereby eliminating the need for an explicit transaction marker.

In an embodiment utilizing a C1/C2 compliant store, a two phase commit protocol and/or a strong serialization of all outstanding writes may be eliminated. Such a two phase commit protocol may include separately recording the start of a new operation or the completion of an old operation as well as performing the new operation. The two phase commit protocol may require additional random input/output operation for each write. Such a strong serialization of all outstanding writes may include beginning a write operation only upon the completion of the previous write operation. Eliminating a two phase commit protocol and/or a strong serialization of all outstanding writes may substantially decrease costs, enhance performance, or a combination thereof.

The body section includes the data set. The data set may include data input or selected by a user. Alternatively, the data set may include data received by, retrieved by, or stored within a computer, such as end-user device 206 or server 202. One or more error identifiers created by error identification component 310 may be included in the body section. In one embodiment, one or more error identifiers may be located at or near the end of the data set, i.e., the end of the data structure. As previously mentioned, the data including error identifiers may be preserved so that data integrity may be verified at any instance.

The data structure may further include an index. Such an index may be calculated and inserted into the data. By calculating an index into the data, the data structure provides pseudo-random access to compressed data. As such, the index may significantly improve latency to access data randomly.

For example, in an embodiment where it is desired that the application delegate the task of compressing the data as well as handling the compressed data, a transparent compression and decompression as well as a transparent pseudo-random access to the data may be provided. To provide such transparent functions, the data in blocks may be compressed and, in some embodiments, each block is compressed independently of other blocks so that it may be decompressed without the need to access other blocks. Each block may be wrapped into the appropriate position within the data structure, and an index block, or set thereof, may be appended to the one or more index blocks. As such, when a particular set of data is desired, which may be specified in terms of position and offset within application-defined data set, coordinates associated with uncompressed data space may be translated to coordinates associated with a compressed data space, the appropriate compressed block may be retrieved, the compressed block may be decompressed, and the requested data may be returned to the application. The sequence of blocks containing compressed data as well as the index blocks describing the data layout and allowing efficient pseudo-random access to the compressed data are enclosed within open-end and close-end brackets. Such brackets indicate that the enclosed blocks are blocks of compressed data with a respective set of indexes (and position of index blocks) that may experience one or more data transformations prior to delivering the data to the application.

Figure 4:
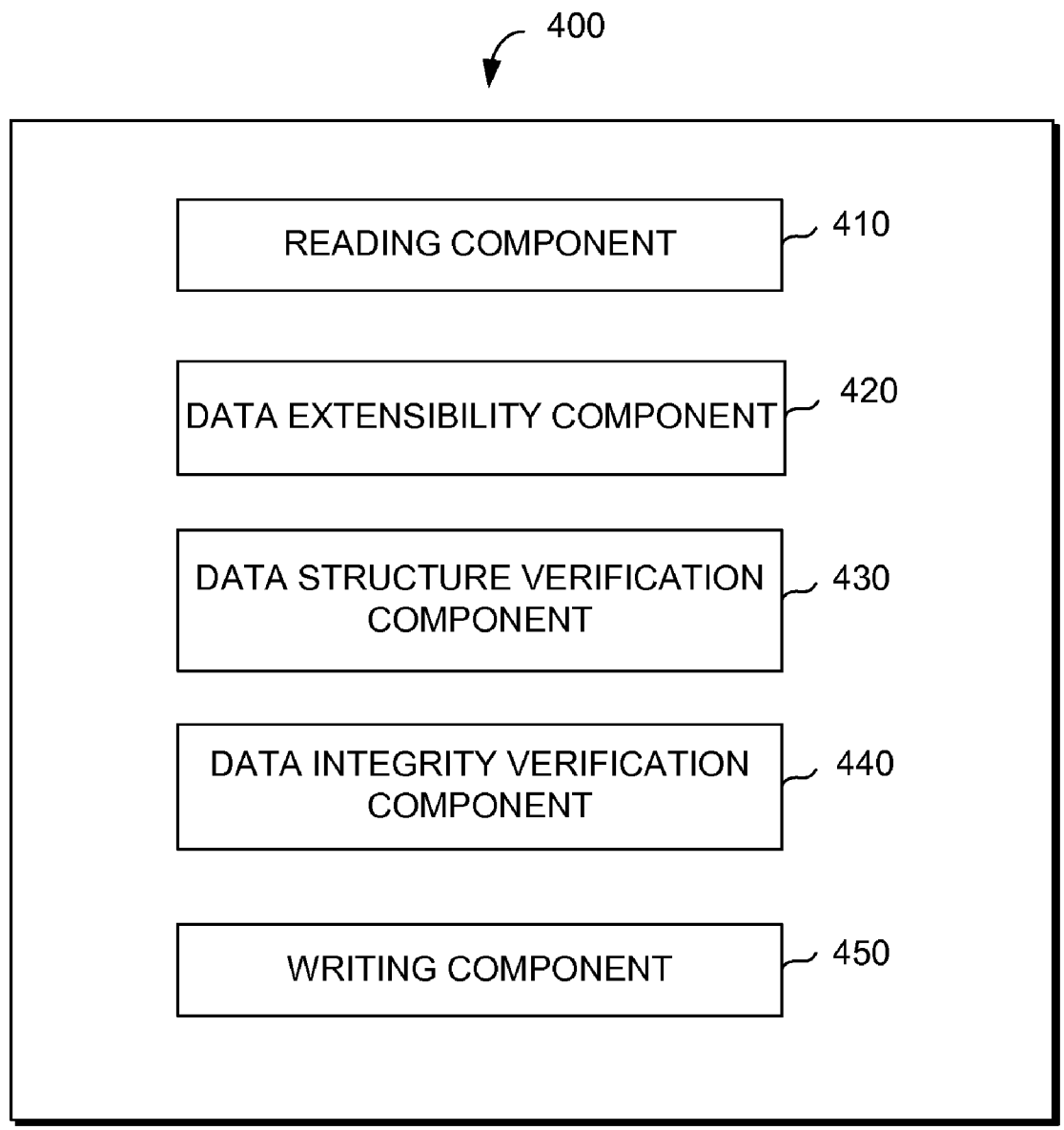
FIG. 4 is a block diagram of an exemplary computing system suitable for a single access operation.

Turning now to FIG. 4, a computer system 400 is described that utilizes a data structure, such as the data structure discussed hereinabove, to perform a single access operation while enabling data structure verification, data integrity verification, and data extensibility. The single access operation may refer to a single access, e.g., read or write, to a memory location including any memory or storage location or to a output device such as a monitor or printer. The computer system 400 includes a reading component 410, a data extensibility component 420, a data structure verification component 430, a data integrity verification component 440, and a writing component 450.

The reading component 410 is configured to read the header section of a data structure, the body section of a data structure, or a combination thereof. In one embodiment, reading component 410 may read the header section and, at a later instance, read the body section. In some embodiments, the data structure is received or retrieved by reading component 410 prior to reading the header section and/or body section.

The data extensibility component 420 may be configured to support complex data, structures, and objects. In addition, data extensibility component 420 may also be configured to support preexisting code, new features, or a combination thereof.

The data structure verification component 430 may be configured to verify data structures. Accordingly, data structure verification component 430 may verify the data structure syntax. In one embodiment, data structure verification component 430 may verify that each open end bracket is paired with a close-end bracket. In addition, in instances where bracket pairs are nested, data structure verification component 430 may also verify that each bracket pair does not overlap other bracket pairs.

The data integrity verification component 440 may be configured to verify the integrity of the data and, thereby, ensure that the data has not incurred corruptions. To verify the integrity of the data, error identifiers presented within the header section and/or the body section may be verified. To verify an error identifier, the data integrity verification component 440 may be configured to obtain, e.g., compute, receive, or retrieve, an error identifier of the data structure read by reading component 410 and compare the obtained error identifier to the error identifier presented within the data structure. In such a case, if the error identifiers match, it is determined that the data has not incurred any corruptions. On the other hand, if the error identifiers do not match, it is determined that the data has incurred corruptions. In such a case, a notification may be provided to indicate that a data corruption has occurred.

In one embodiment, data integrity verification component 440 may be configured to verify each error identifier presented within the data structure. Alternatively, data integrity verification component 440 may be configured to verify specific error identifiers, such as error identifiers associated with specific data or desired data within the header section or body section. In either embodiment, the error identifiers may be verified in a particular order. For example, the error identifiers located within the header section may be verified followed by the error identifiers located within the body section. In an embodiment where the header section has a standard portion and an auxiliary portion, the error identifiers located within the standard portion may be verified prior to the verification of the error identifiers located within the auxiliary portion. In such a case, the order of verification may enhance verification efficiency. For example, if it is determined that the header is corrupted, then it is unnecessary to verify the data within the body section because a data structure with a corrupted header section is corrupted even though the error identifiers of the body section match computed error identifiers.

The data integrity verification component 440 may also be configured to detect data structure location errors. In such an embodiment, data integrity verification component 440 may utilize the data provided in the location origin signature field to verify the location of the data structure or portion of the data structure.

In the event the data structure includes a compressed form and/or an encrypted form, the data integrity verification component 440 may also be configured to uncompress or decrypt data. Where a compressed form is utilized, the data integrity verification component may uncompress the compressed portion and, thereafter, verify data integrity. Where an encrypted form is utilized, the data integrity verification component may decipher the original message if a key is given to decrypt data and, thereafter, verify data integrity. The data integrity verification component 440 may verify error identifiers during re-compression. Re-compression may be postponed to times of low-utilization without incurring additional access.

The writing component 450 may be configured to write the data structure to a memory location, such as computer memory, a disk, or other storage device. Writing component 450 is utilized in an instance where the single access is a write operation. In some embodiments, writing component 450 may write a data structure to a memory location only in instances where the data structure, or portion thereof, is verified, the data integrity, or portion thereof, is verified, and/or the data structure, or portion thereof, may be supported. Writing component may utilize a confidence level to determine whether the data structure or data is verified and whether the data structure may be supported. In such a case, the confidence level may be determined by an algorithm or set forth by a program developer, a program administrator, or a program user.

In an instance where there is an error in the data structure, data, or support, an indication of such an error may be presented. The indication of the error may be in the form of a error message presented to a user. The error message may include, in some instances, an identification of the specific error. In addition, the error message may also include a suggestion of how to recover the data or overcome the error. In cases where an error is detected, writing component 450 may also be configured to correct the error. For example, correcting the error may include an automatic repeat request that may be sent to the transmitter, which sends any data not acknowledged. Alternatively, correcting the error may include a forward error correction procedure to decode the most likely data.

Writing component 450 may also be configured to write data structures sequentially, such as when writing component 450 is writing the data structure to a disk or other storage device. Writing sequentially is an efficient procedure and enables an efficient determination of a failed write indicating corruption or a successful write. As such, writing component 450 may be configured to write a data structure to the first available position following a previous completely written or partially written data structure such that no overlapping of data structures occurs. The first available position is determined by the length of the previous data structures that have been completely or partially written to the storage device. By way of example, assume a file is empty and the first data structure is 1000 bytes. In such a case, writing component 450 may begin writing the data structure in position zero. Upon obtaining a second data structure that is 2000 bytes, writing component 450 may then write the second data structure in position 3000.

In some embodiments involving the writing of a data structure, where a second data structure completes prior to completion of a first data structure, having a previously started write, writing component 450 may wait until the write of the first data structure is complete or failed, rather than performing a completion of the second data structure. In an instance where the first data structure fails, a failure may be reported for both the first data structure write and the second data structure write. On the other hand, if the first data structure write completes, the successful completion of both the first data structure write and the second data structure write may be reported. Waiting until a prior data structure is complete provides an indication that a file is uncorrupted from the beginning of a file to the instance successful writes are reported to the user.

In some embodiments, writing component 450 may also be configured to extend the file size initially so that the file size does not need to be extended each instance new data is written to the file. In such an embodiment, upon nearing the end of the file, the file size may again be extended. For example, upon nearing the end of the file, the file size may be doubled.

The writing component 450 may also be configured to write the data structure to an output device, such as a computer monitor or printer. In some embodiments, writing component 450 may present a data structure only in instances where the data structure, or portion thereof, is verified; the data integrity, or portion thereof, is verified; and/or the data structure, or portion thereof, may be supported. Writing component 450 may utilize a confidence level to determine whether the data structure or data is verified and whether the data structure may be supported. In such a case, the confidence level may be determined by an algorithm or set forth by a program developer, a program administrator, or a program user.

Figure 5:
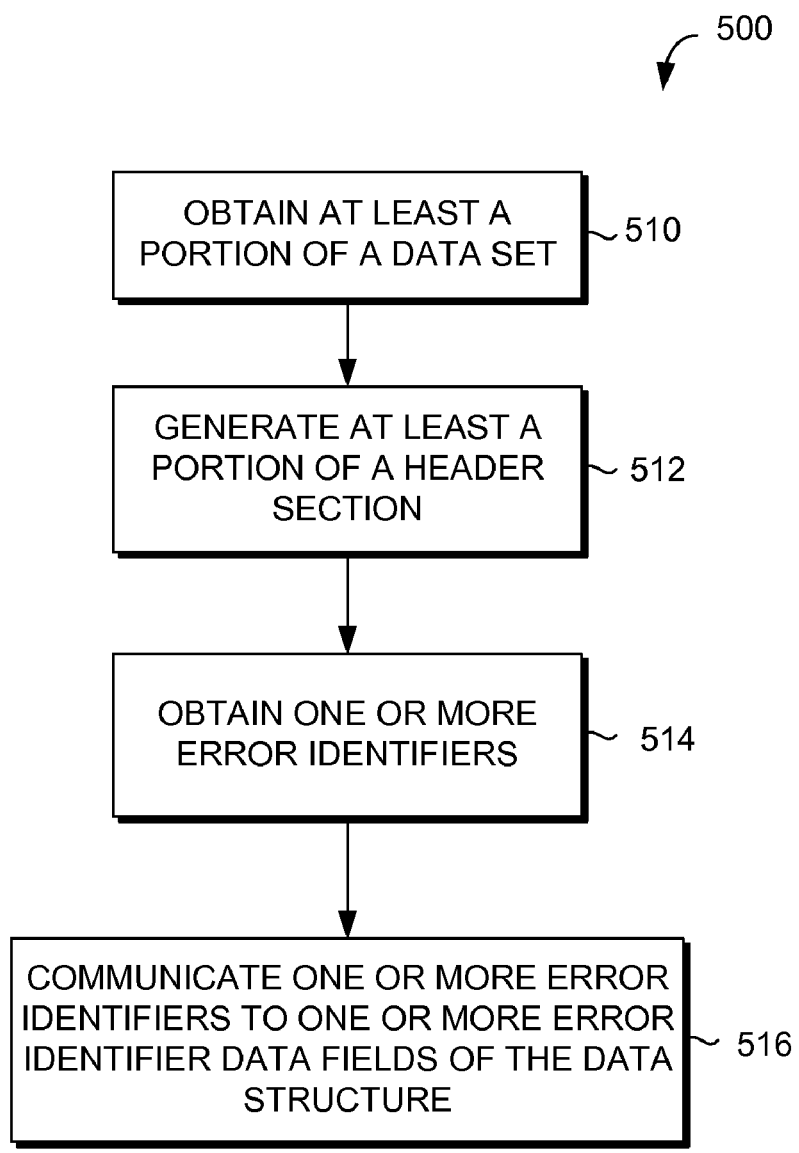
FIG. 5 is a flowchart of an exemplary process for generating a data structure.

With reference to FIG. 5, a flow diagram is shown illustrating a method 500 for formatting a data set to correspond with a data structure that supports a single access operation while enabling data structure verification, data integrity verification, and data extensibility, in accordance with an embodiment of the present invention. Initially, as indicated at block 510, at least a portion of a data set is obtained. A portion or a complete data set may be obtained by receiving or retrieving data. At block 512, at least a portion of a header section is generated. As such, data is input into one or more fields of the header section. As previously mentioned, the header section may have a standard portion and an auxiliary portion. One or more error identifiers are obtained at block 514. The error identifiers may pertain to data within the header section, data within the body section, or a combination thereof, and, in one embodiment, may be obtained by performing a computation. Upon obtaining one or more error identifiers at block 514, the error identifiers may be communicated to one or more error identifier data fields of the data structure at block 516.

Figure 6:
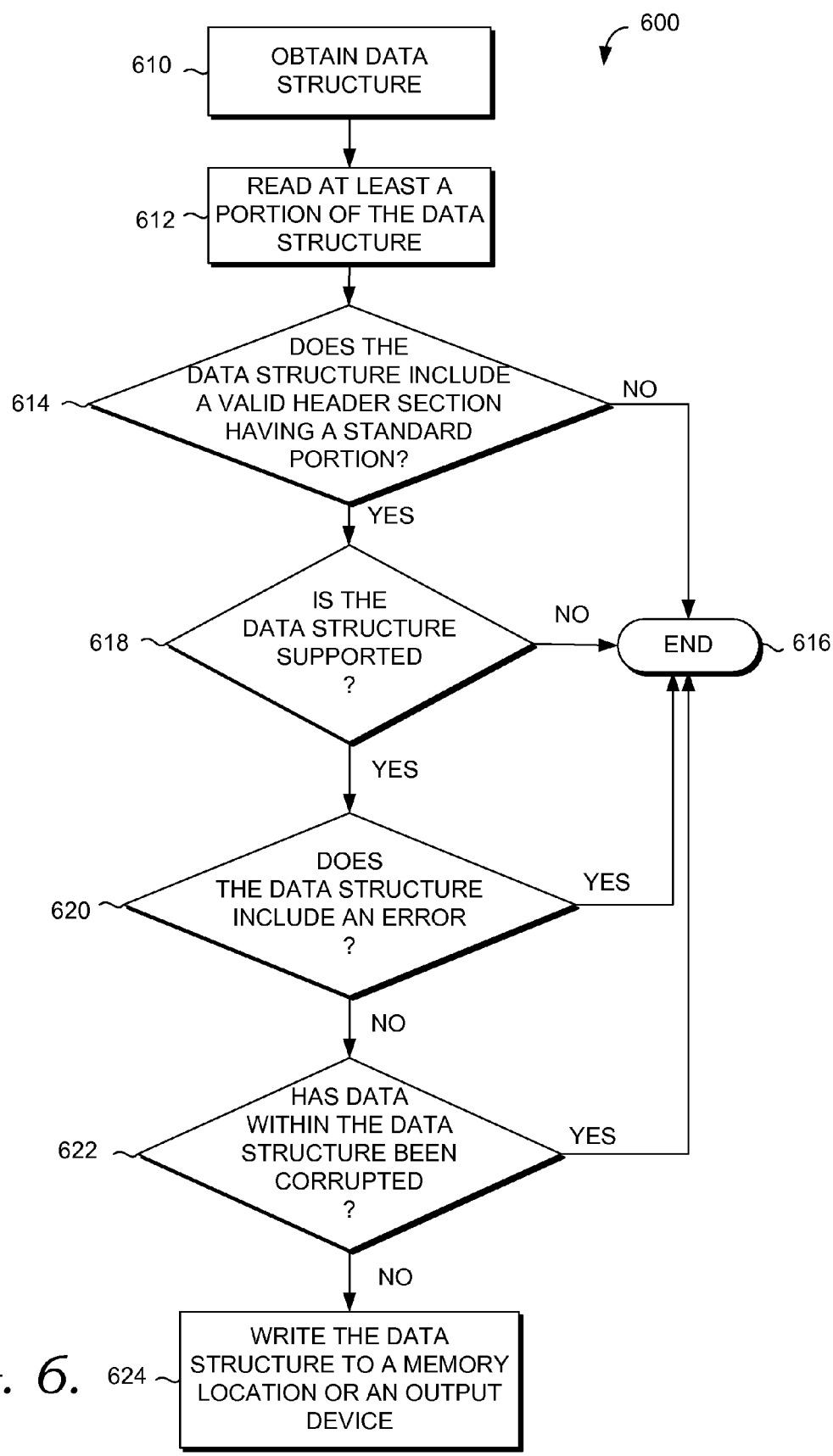
FIG. 6 is a flowchart of an exemplary process for performing a single memory location operation.

Turning now to FIG. 6, a flow diagram is shown illustrating a method 600 for utilizing a data structure to perform a single access operation while enabling data structure verification, data integrity verification, and data extensibility, in accordance with an embodiment of the present invention. Initially, as indicated at block 610, a data structure having a verifiable data structure, verifiable data, and data extensibility is obtained, e.g., received or retrieved. At least a portion of the data structure is read at block 612. At block 614, it is determined if the data structure includes a valid header section having a standard portion. If it is determined that the data structure does not include a valid header section having a standard portion, the method ends at block 616. If, however, it is determined that the data structure does include a valid header section having a standard portion, at block 618, it is determined whether the data structure is supported, e.g., complex data, forward compatibility, and backward compatibility. If it is determined that the data structure is not supported, the method ends at block 616. If, however, it is determined that the data structure is supported, at block 620 it is determined whether the data structure includes an error. If it is determined that the data structure includes an error, the method ends at block 616. On the other hand, if it is determined that the data structure does not include an error, it is determined if the data has been corrupted at block 622. If it is determined that data corruption has occurred, the method ends at block 616. If, however, it is determined that no data corruption has occurred, at block 624, the data structure is written to a memory location or an output device. In instances where a sequential write is desired, such as in the instance of writing to a disk, the data structure is written to the first available position following a previous completely written or partially written data structure such that no overlapping of data structures occurs. Before completing the data structure write, it is determined if prior data structures are completed or failed. If it is determined that the prior data structures are complete, the current data structure writing is completed. If, however, it is determined that one or more prior data structures failed, the current data structure writing is not completed and a failure is reported.

As shown in the above scenarios, the present invention may be implemented in various ways. From the foregoing, it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. One or more computer-storage media having stored thereon a data structure, comprising:
a header section comprising a first portion for one or more predefined data and an auxiliary portion for one or more user-defined data, and
a body section comprising a data set,
wherein the data structure includes one or more error identifier fields utilized to verify data integrity, and one or more bracket pairs indicating data format integrity and supporting data structure extensibility, wherein the one or more bracket pairs include an open-end bracket and a close-end bracket,
and wherein the open-end bracket references the close-end bracket such that the data structure is verified,
and wherein the data structure supports a single access operation accessing each of the one or more predefined data, the one or more user-defined data, the data set, and information associated with data structure verification, data integrity verification, or data extensibility, the single access operation being an action including each of writing the data structure to a memory, verifying the data structure, and verifying the integrity of data of the data structure.

2. The media of claim 1, wherein the data structure includes a minimal version field configured to support data structure extensibility.

3. The media of claim 1, wherein the data structure includes a location origin signature field configured to identify data structures, or portions thereof, positioned in an incorrect location.

4. The media of claim 1, wherein at least one of the error identifier fields is positioned within the first portion and the auxiliary portion of the header section.

5. The media of claim 4, wherein the at least one of the error identifier fields defaults to a zero value where it is unnecessary to provide auxiliary information for the data structure.

6. The media of claim 1, wherein the single access operation is a single read or write to a memory location.

7. One or more computer-storage media containing thereon computer-readable code for generating a data structure configured to perform a single access operation while enabling data structure verification, data integrity verification, and data extensibility comprising:
obtaining one or more error identifiers for a header section of the data structure, a body section of the data structure, or a combination thereof, wherein the one or more error identifiers indicate a verification of data integrity;
formatting the header section comprising:
one or more header section data,
one or more bracket pairs configured to verify data structure integrity and to support data structure extensibility,
one or more error identifier fields, including at least one of the error identifiers obtained to verify data integrity, and
a minimal version field that indicates the minimal version of a program that is necessary to support the data structure, wherein the minimal version field extends the use of preexisting code on a computing device lacking the minimal version of the program such that the computing device is configured to support the data structure in a modified format;
wherein the header section comprises a first portion and an auxiliary portion; and
formatting the body section comprising one or more body section data,
and wherein the data structure supports a single access operation while enabling data structure verification, data integrity verification, and data extensibility such that the single access operation is an action including a single read or write of both data and metadata to a memory location while verifying the data structure and verifying the integrity of data of the data structure.

8. The media of claim 7, wherein the one or more error identifiers comprise a value, text, signature, or combination thereof.

9. The media of claim 8, wherein the one or more identifiers comprise a checksum, a cyclic redundancy check, a secured signature, a MD5 signature, a SHA-256 signature, or a combination thereof.

10. The media of claim 7, wherein each of the first portion of the header section and the auxiliary portion of the header section include at least one error identifier field.

11. The media of claim 7, wherein the first portion of the header section includes a data type field that communicates the type of data within the data set and a size field that communicates the size of the first portion of the header.

12. The media of claim 7, wherein the minimal version field is configured to provide new features for a subsequent version following the minimal version of the program that is necessary to support the data structure such that the subsequent version is able to support the new features of the minimal version of the program.

13. One or more computer-storage media containing thereon computer-readable code for utilizing a data structure configured to enable data structure verification, data integrity verification, and data extensibility to perform a single access operation, comprising:

obtaining the data structure;

reading at least a portion of the data structure that performs a single access operation while enabling data structure verification, data integrity verification, and data extensibility, wherein the data structure comprises a header section and a body section;

determining if at least a portion of the data structure includes an error, wherein determining if at least a portion of the data structure includes an error comprises:
(i) identifying one or more bracket pairs, wherein the bracket pairs include an open-end bracket and a close-end bracket;
(ii) determining that the open-end bracket references the close-end bracket; and
(iii) based on the determination that the open-end bracket references the close-end bracket, determining that the data structure does not include an error;

determining if at least a portion of data within the data structure is corrupted, wherein determining if at least a portion of data within the data structure is corrupted includes:

identifying two or more bracket pairs, wherein at least one inner bracket pair is nested within an outer bracket pair;

identifying whether the data structure is corrupted by verifying the integrity of only the outer bracket pair;

upon verifying the integrity of the outer bracket pair, determining that the data structure is not corrupted; and upon identifying that the integrity of the outer bracket pair is not verified, determining that the data structure is corrupted; and in the single access operation, writing the data structure, including both data and metadata, to a memory location, wherein the metadata includes information regarding data structure verification, data integrity verification, or data extensibility of the data structure.

14. The media of claim 13, wherein determining if the at least a portion of data within the data structure is corrupted comprises computing an error identifier and comparing the computed error identifier to a corresponding error identifier presented within the data structure.

15. The media of claim 13, further comprising determining whether the data structure including complex data, a new feature, or a prior program version is supported.

16. The media of claim 13, further comprising writing the data structure to an output device.

17. The media of claim 13, wherein writing the data structure to the memory location comprises:

identifying a memory location, wherein identifying the memory location comprises locating the first available position following a previous completely written or partially written data structure such that no overlapping of the data structures occurs;

determining if previous data structures are completed; and if the previous data structures are completed, writing the data structure to the identified memory location.

18. The media of claim 17, further comprising reporting a failure for the data structure if the previous data structures are not completed.

19. The media of claim 13, wherein at least a portion of the data structure is in compressed form, encrypted form, or a combination thereof.

* * * * *